(12) United States Patent
Hayashi et al.

(10) Patent No.: US 10,198,796 B2
(45) Date of Patent: Feb. 5, 2019

(54) INFORMATION PROCESSING APPARATUS, CONTROL METHOD OF INFORMATION PROCESSING APPARATUS, AND NON-TRANSITORY STORAGE MEDIUM STORING INFORMATION PROCESSING PROGRAM

(71) Applicant: OLYMPUS CORPORATION, Hachioji-shi, Tokyo (JP)

(72) Inventors: Toshikazu Hayashi, Hachioji (JP); Hideaki Yoshida, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 130 days.

(21) Appl. No.: 15/181,851

(22) Filed: Jun. 14, 2016

(65) Prior Publication Data

US 2017/0076457 A1 Mar. 16, 2017

(30) Foreign Application Priority Data

Sep. 14, 2015 (JP) .................................. 2015-180339

(51) Int. Cl.
*G06T 5/00* (2006.01)
*G06T 7/60* (2017.01)

(52) U.S. Cl.
CPC ................ *G06T 5/006* (2013.01); *G06T 7/60* (2013.01); *G06T 2207/10016* (2013.01); *G06T 2207/30164* (2013.01)

(58) Field of Classification Search
CPC . G06T 5/006; G06T 7/60; G06T 2207/10016; G06T 2207/30164
See application file for complete search history.

(56) References Cited

U.S. PATENT DOCUMENTS

| 8,322,863 B1* | 12/2012 | Cho ..................... H04N 9/3185 353/70 |
| 2007/0138371 A1* | 6/2007 | Marshall ............... G01S 7/4812 250/201.3 |
| 2009/0268044 A1* | 10/2009 | Gill ....................... H04N 1/6086 348/222.1 |
| 2010/0309391 A1* | 12/2010 | Plut ...................... H04N 9/3117 348/756 |
| 2015/0287192 A1* | 10/2015 | Sasaki ................ A61B 1/00009 382/128 |

FOREIGN PATENT DOCUMENTS

| JP | 10-281728 A | 10/1998 |
| JP | 2007-328694 A | 12/2007 |

* cited by examiner

*Primary Examiner* — Michael E Teitelbaum
(74) *Attorney, Agent, or Firm* — Volpe and Koenig, P.C.

(57) ABSTRACT

According to the present invention, an information processing apparatus includes: an information acquiring unit which acquires data regarding a target; an information correction unit which corrects the data to generate corrected data to measure information regarding the target; and a recording control unit which records the data and the corrected data in association with each other.

13 Claims, 12 Drawing Sheets

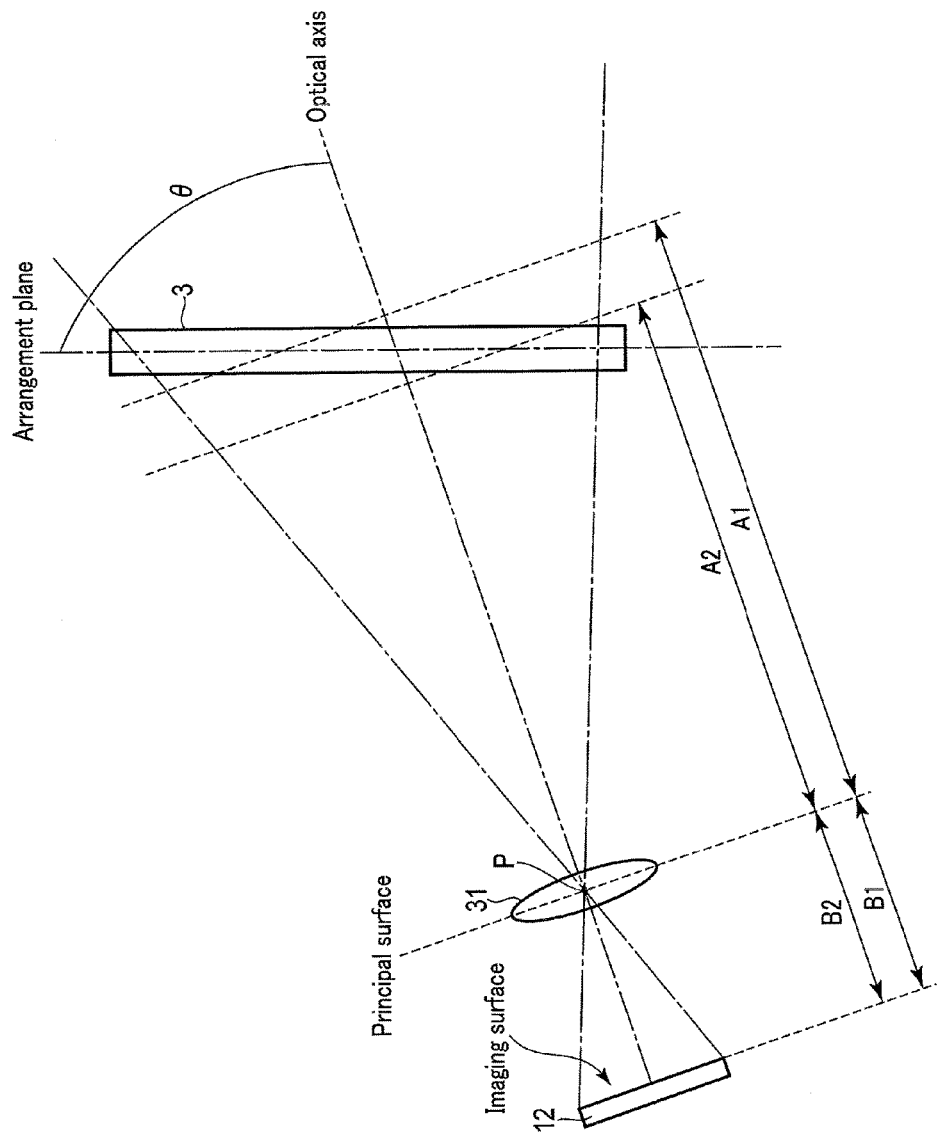
F I G. 4

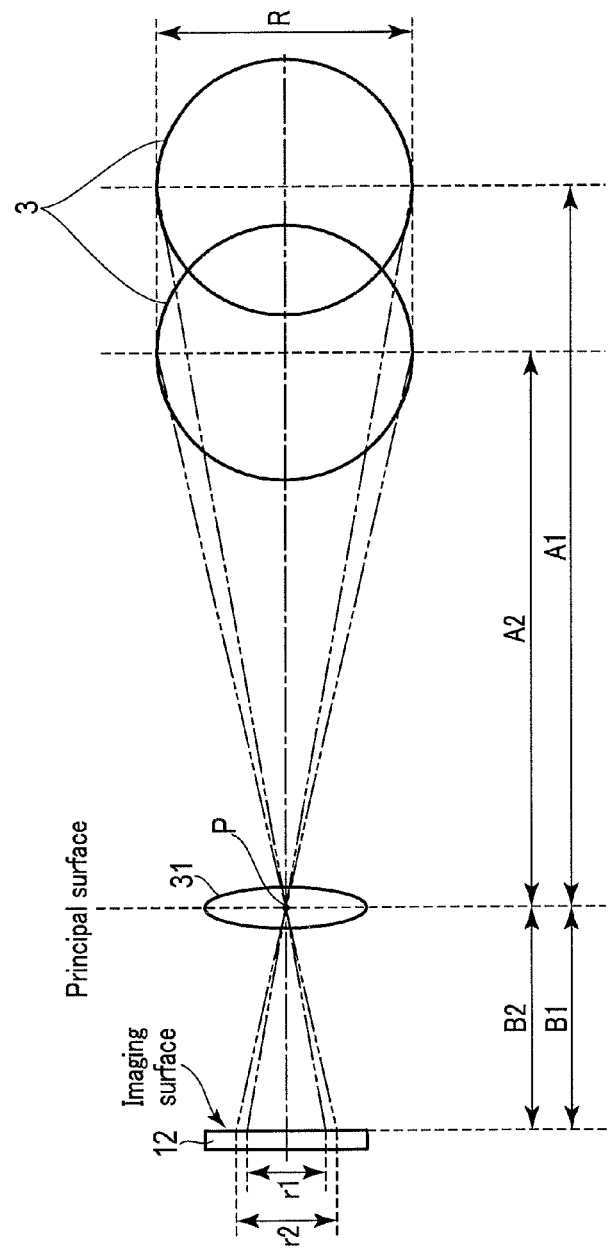
F I G. 5

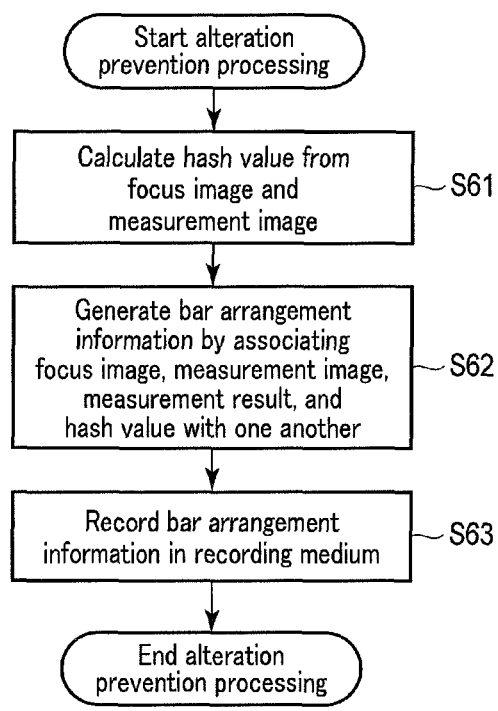
F I G. 10

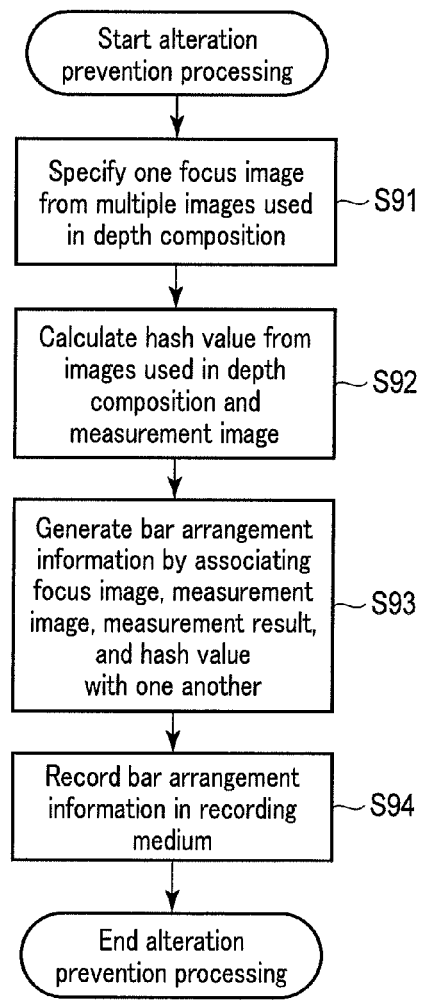
F I G. 12

INFORMATION PROCESSING APPARATUS, CONTROL METHOD OF INFORMATION PROCESSING APPARATUS, AND NON-TRANSITORY STORAGE MEDIUM STORING INFORMATION PROCESSING PROGRAM

CROSS-REFERENCE TO RELATED APPLICATIONS

This application is based upon and claims the benefit of priority from the prior Japanese Patent Application No. 2015-180339, filed Sep. 14, 2015, the entire contents of which are incorporated herein by reference.

BACKGROUND OF THE INVENTION

1. Field of the Invention

The present invention relates to an information processing apparatus, a control method of an information processing apparatus, and a non-transitory storage medium storing an information processing program.

2. Description of the Related Art

A technique for measuring, for example, the length of a subject from an image is in practical use. For example, Jpn. Pat. Appln. KOKAI Publication No. 10-281728 describes the calculation of the actual dimensions of a target for measurement on the basis of an image in which a measurement reference having known dimensions is shown together with the target.

Jpn. Pat. Appln. KOKAI Publication No. 2007-328694 describes a configuration which makes a keystone correction of an image.

For example, it is supposed that the target is measured by the method according to Patent Literature 1 on the basis of the image corrected by the method according to Patent Literature 2. However, in this case, it is necessary to record the image before correction together with the image after correction to ensure the validity of the image after correction. However, the problem is that ensuring the validity of the image after correction is difficult if the image before correction is artificially corrected.

BRIEF SUMMARY OF THE INVENTION

The present invention is intended to provide an information processing apparatus, a control method of an information processing apparatus, and a non-transitory storage medium storing an information processing program that are capable of ensuring the validity of an image after a correction.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 is a diagram illustrating an example of a positional relation between the imaging apparatus and a target according to one embodiment;

FIG. 5 is a diagram illustrating an example of a positional relation between the imaging apparatus and the target according to one embodiment;

FIG. 10 is a diagram illustrating an example of alteration prevention processing by the imaging apparatus according to one embodiment;

FIG. 12 is a diagram illustrating an example of alteration prevention processing by an imaging apparatus according to another embodiment.

DETAILED DESCRIPTION OF THE INVENTION

An information processing apparatus, a control method of an information processing apparatus, and an information processing program according to one embodiment will hereinafter be described in detail with reference to the drawings.

Figure 1:
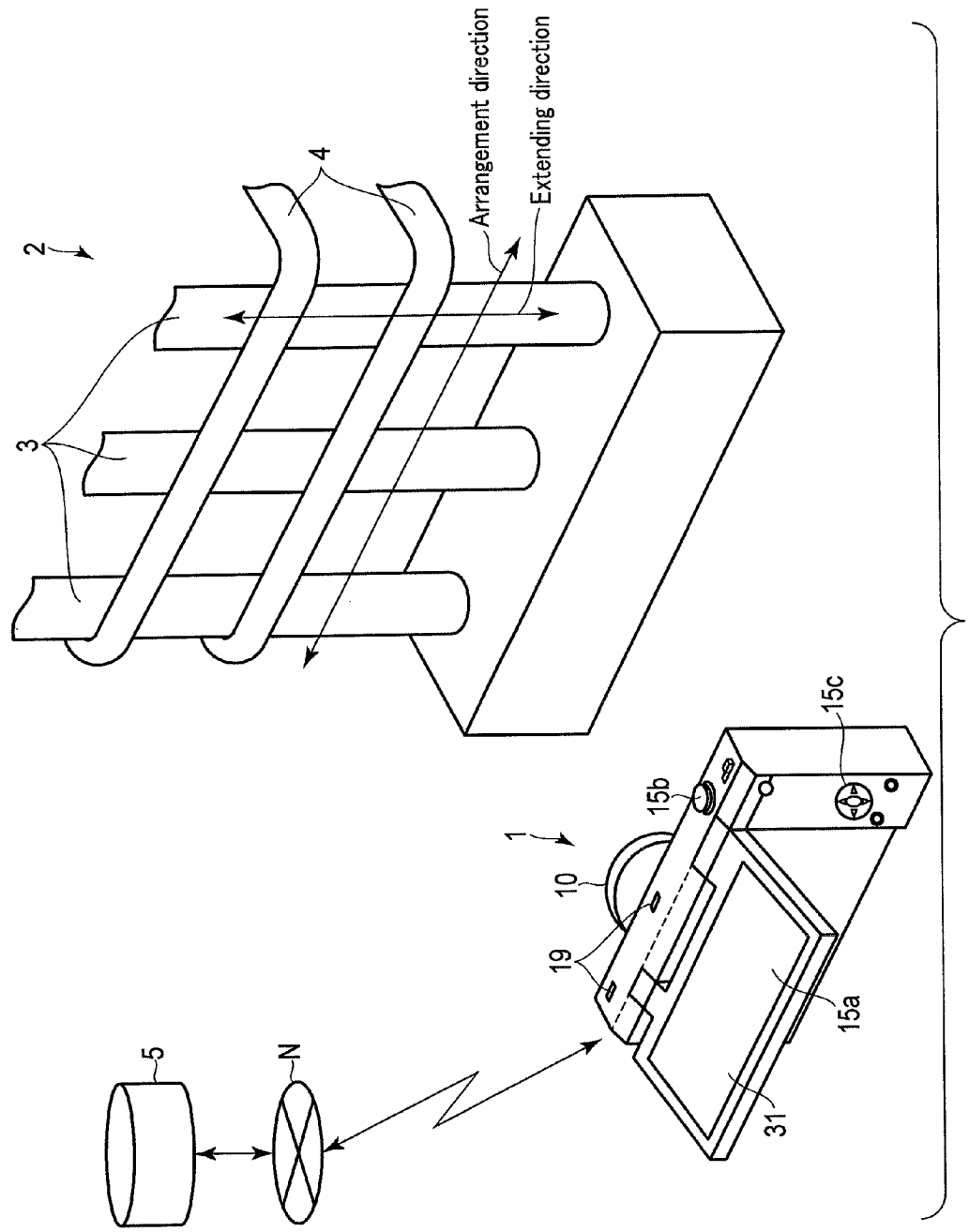
FIG. 1 is a diagram illustrating an example of the use of an imaging apparatus according to one embodiment.

FIG. 1 is an explanatory diagram showing an example of how a structure 2 composed of reinforcing bars that are arranged on the same plane is imaged by an imaging apparatus 1 as an example of the information processing apparatus. The imaging apparatus 1 is an apparatus which is used in, for example, a construction site and which acquires an image of the structure 2, the diameters, interval, and number of the reinforcing bars constituting the structure 2.

The structure 2 has main reinforcements 3 provided along a first direction (e.g. an arrangement direction), and lateral ties 4 provided along a second direction (e.g. an extending direction) that intersects at right angles with the first direction. For example, when the structure 2 is used in a column of a reinforced concrete construction, the main reinforcements 3 are provided in the vertical direction, and the lateral ties 4 are provided in the horizontal direction. The structure 2 may be any object comprising reinforcing bars that are arranged on the same plane.

The imaging apparatus 1 acquires design information stored in a server 5 via a network N. The design information includes, for example, construction names for the respective construction cases, a list of construction places for the respective construction names, a list of part names in the respective construction places, and reinforcing bar layout diagrams showing the arrangements of reinforcing bars for the respective part names. The parts may be any parts such as a column, a beam, a floor face, or a wall.

The imaging apparatus 1 acquires a focus image in which the reinforcing bars that constitute the structure 2 are imaged as a focus target for each part name. The imaging apparatus 1 corrects the focus image on the basis of the relation between the imaging optical axis of the imaging apparatus 1 and the reinforcing bars at the time of the acquisition of the focus image and on the basis of the distance to the reinforcing bars, and generates a measurement image as a corrected image. The imaging apparatus 1 measures the diameter of each reinforcing bar and the interval between the reinforcing bars on the basis of the measurement image. The imaging apparatus 1 generates a hash value as alteration prevention data on the basis of the focus image and the measurement image. The focus image, the measurement image, and a measurement result and the hash value as various auxiliary information that are associated with one another are hereinafter collectively referred to as "bar arrangement information". The imaging apparatus 1 records this "bar arrangement information" in its recording unit, or uploads the "bar arrangement information" on the server 5 via the network N.

Figure 2:
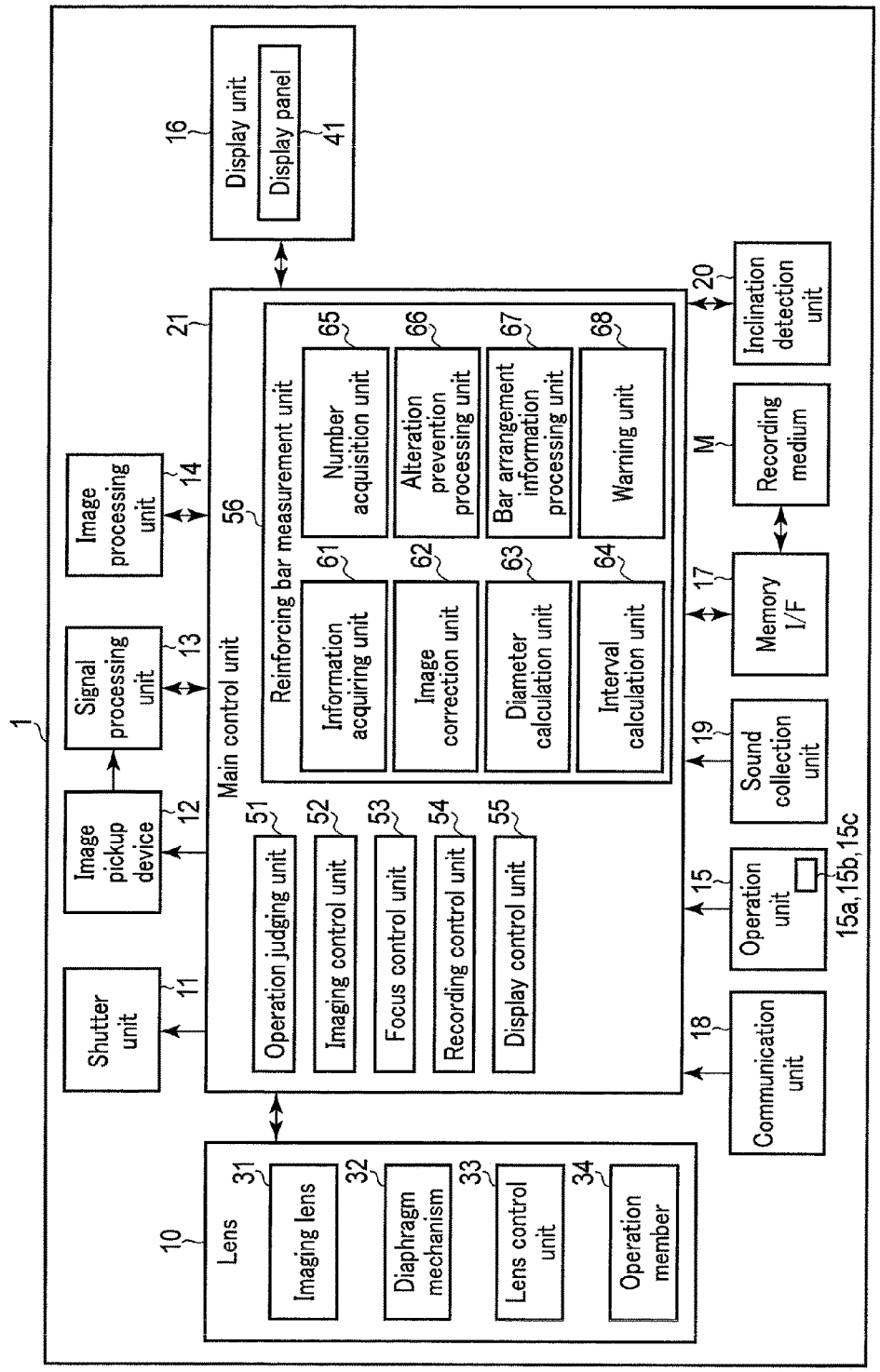
FIG. 2 is a diagram illustrating an example of a control system of the imaging apparatus according to one embodiment.

FIG. 2 is a block diagram illustrating an example of the configuration of the imaging apparatus 1.

As shown in FIG. 2, the imaging apparatus 1 comprises a lens 10, a shutter unit 11, an image pickup device 12, a signal processing unit 13, an image processing unit 14, an operation unit 15, a display unit 16, a memory I/F 17, a communication unit 18, a sound collection unit 19, an inclination detection unit 20, and a main control unit 21.

The lens 10 forms transmitted light into an image on the image pickup device 12. The lens 10 comprises an imaging lens 31 having a combination of lenses, a diaphragm mechanism 32, a lens control unit 33 which controls the operations of the imaging lens 31 and the diaphragm mechanism 32, and an operation member 34.

The imaging lens 31 forms light rays from a subject into an image on an imaging surface of the image pickup device 12. The imaging lens 31 comprises a lens for focusing (focus lens), a lens (a variator lens and a compensator lens) for changing the focus distance, and a relay lens. The imaging lens 31 images a subject figure into an image on the imaging surface of the image pickup device 12 by moving the focus lens in the optical axis direction of the imaging lens 31 on the basis of the control of the lens control unit 33 or the operation of the operation member 34. The imaging lens 31 changes the focus distance by moving the variator lens and the compensator lens in the optical axis direction of the imaging lens 31 on the basis of the control of the lens control unit 33 or the operation of the operation member 34.

The diaphragm mechanism 32 is configured to open and close, and adjusts the amount of the light rays entering the image pickup device 12 via the imaging lens 31 under the control of the lens control unit 33.

The lens control unit 33 is configured to be able to communicate with the main control unit 21. The lens control unit 33 respectively controls the driving of the focus lens, the driving of the variator lens and the compensator lens, and the driving of the diaphragm mechanism 32 in accordance with the input from the main control unit 21 and the operation of the operation member.

The lens control unit 33 can detect the focus distance of the imaging lens 31 by detecting the positions of the variator lens and the compensator lens. The lens control unit 33 inputs the detected focus distance of the imaging lens 31 to the main control unit 21.

The lens control unit 33 can detect the distance (subject distance) from the principal point of the imaging lens 31 to the subject which is the focus target and the distance (figure distance) from the principal point to the imaging surface of the image pickup device 12 by detecting the position (focus position) of the focus lens at the time of focusing. The lens control unit 33 inputs the detected subject distance and figure distance to the main control unit 21. When the imaging lens 31 is a thick lens, the subject distance is the distance from the front principal point to the subject which is the focus target, and the figure distance is the distance from the rear principal point to the imaging surface.

The shutter unit 11 is a mechanism which adjusts the amount of light entering the image pickup device 12 through the lens 10. The shutter unit 11 is, for example, a focal plane shutter.

The image pickup device 12 is provided in the rear of the lens 10, that is, inside the housing of the imaging apparatus 1. The image pickup device 12 comprises the imaging surface in which imaging pixels for photoelectrically converting light and storing a charge are arranged. A color filter is provided on the light entrance surface of each imaging pixel. The image pickup device 12 comprises, for example, a charge coupled devices (CCD) image sensor, a complementary metal oxide semiconductor (CMOS) image sensor, or some other image pickup device. The image pickup device 12 generates an image signal by converting, into an electric signal corresponding to the light amount, the subject figure which has been collected by the lens 10 and formed into the image on the imaging surface.

Furthermore, AF areas are formed on the imaging surface in the image pickup device 12. Imaging pixels, first focus pixels, and second focus pixels are arranged in each of the AF areas. The first focus pixels and the second focus pixels are restricted at positions different in entrance region. The first focus pixels and the second focus pixels photoelectrically convert and store the light that has entered, in the same manner as the imaging pixels. The imaging surface of the image pickup device 12 may be arranged in the shape of a flat surface or in the shape of a curved surface.

The signal processing unit 13 reads the image signal generated by the image pickup device 12 under the control of the main control unit 21. The signal processing unit 13 subjects the read image signal to various signal processing under the control of the main control unit 21. The signal processing unit 13 converts the signal-processed image signal into image data of a digital signal, and inputs the image signal to the main control unit 21.

As described above, the lens 10, the image pickup device 12, and the signal processing unit 13 constitute an imaging unit. The imaging unit acquires image data when the image pickup device 12 images the light which has been formed into an image on the imaging surface by the lens 10. The imaging unit also acquires image data as a still image by the imaging action described above. The imaging unit sequentially acquires image data to be displayed as through-images. For example, the imaging unit can acquire successive image data displayable as a through-image when the signal processing unit 13 reads the image signals sequentially taken by the image pickup device 12 at a period based on the control of the main control unit 21.

The image processing unit 14 subjects the image data to various image processing such as a color correction, a gamma (γ) correction, a contrast correction, black-and-white/color mode processing, and through-image processing under the control of the main control unit 21. The image processing unit 14 compresses the image data by the JPEG method to convert the image data into JPEG data which is image data based on a JPEG method under the control of the main control unit 21. The image processing unit 14 inputs the JPEG data to the main control unit 21.

The operation unit 15 comprises multiple operation members for a user to perform various operations of the imaging apparatus 1. The operation members include, for example, a touch sensor 15*a*, a release button 15*b*, a cross button 15*c*, and various other buttons. The touch sensor 15*a* is, for example, a resistive-film touch sensor or an electric-capacitance touch sensor. That is, the touch sensor 15*a* is a specified position acquiring unit which acquires information indicating a specified position in a certain region. The touch sensor 15*a* is provided integrally with a later-described display panel 41 of the display unit 16, detects a signal (touch position signal) indicating a position on the display panel 41 that is touched, and inputs the detected touch position signal to the main control unit 21.

The release button 15*b* is an operation member for the user to instruct the imaging apparatus 1 on the operation and imaging assist control for acquiring an image. When the release button 15*b* is pressed halfway, the operation unit 15 issues, to the main control unit 21, an instruction on the imaging assist control for automatic exposure (AE) processing and automatic focus (AF) processing. When the release button 15*b* is fully pressed, the operation unit 15 issues, to the main control unit 21, an instruction on an imaging action for acquiring an image.

The cross button 15*c* is an operation member for the user to instruct the imaging apparatus 1 on up-down and right-left selection operations. For example, the operation unit 15 issues, to the main control unit 21, an instruction on the up-down and right-left selection operations in various menus in response to an operation of the cross button 15*c* by the user.

The display unit 16 displays a screen on the basis of the image data input from the main control unit 21. The display unit 16 comprises a display device, and a drive circuit which displays the screen on the display device on the basis of the image data. The display unit 16 comprises, for example, the display panel 41 as the display device.

The display panel 41 is, for example, a liquid crystal display, an organic EL display, or some other display device which displays screens. The display panel 41 functions as a touch panel (touch screen) with which the above-mentioned the touch sensor 15*a* is combined. The display panel 41 is provided, for example, on a support which is rotatably provided from the backside of the housing of the imaging apparatus 1. The support is provided rotatably around the axis of a hinge provided on the backside of the housing. Thus, the angle of the display panel 41 can be changed.

The memory I/F 17 comprises a card slot into which a recording medium M having multiple contact terminals can be inserted, and a contact terminal which is electrically connected to the contact terminals of the recording medium M when the recording medium M is inserted in the card slot. The recording medium M is, for example, a memory card. The memory I/F 17 relays the input/output of data between the recording medium M and the main control unit 21.

The communication unit 18 is an interface for connecting to the network N. The communication unit 18 can communicate with the server 5 connected to the network N by connecting to the network N. The communication unit 18 can communicate with other devices connected to the network N, for example, by wirelessly communicating with an unshown access point connected to the network N. The communication unit 18 may be configured to communicate with other devices connected to the network N, for example, by performing a wired communication with an unshown router connected to the network N.

The sound collection unit 19 collects sound. For example, the sound collection unit 19 is a stereo microphone. The sound collection unit 19 converts sound into an analog electric signal, and converts the electric signal into a digital signal, thereby acquiring digital audio data. The sound collection unit 19 inputs the acquired audio data to the main control unit 21.

The inclination detection unit 20 detects the inclination of the housing of the imaging apparatus 1. The inclination detection unit 20 comprises, for example, an acceleration sensor, and detects the inclination of the housing of the imaging apparatus 1 on the basis of the detection result by the acceleration sensor. Specifically, the inclination detection unit 20 detects the inclination of the housing of the imaging apparatus 1 in a roll direction on the optical axis of the imaging lens 31 of the imaging unit on the basis of the detection result by the acceleration sensor. The inclination detection unit 20 also detects the inclination of the housing of the imaging apparatus 1 in a pitch direction on the horizontal direction of the imaging surface of the image pickup device 12, that is, the inclination of the lens 10 in an up-down direction on the axis of the housing of the imaging apparatus 1. The inclination detection unit 20 also detects the inclination of the housing of the imaging apparatus 1 in a yaw direction on the vertical direction of the imaging surface of the image pickup device 12, that is, the inclination of the lens 10 in a right-left direction on the axis of the housing of the imaging apparatus 1.

The inclination detection unit 20 can recognize the direction of an arrangement plane in which the main reinforcements 3 are arranged on the basis of the previously acquired design information. Moreover, the inclination detection unit 20 may be configured to detect a horizontal inclination of the optical axis of the imaging lens 31 relative to the arrangement plane as the inclination of the housing of the imaging apparatus 1 in the yaw direction by acquiring, from a geomagnetic sensor, the direction in which the optical axis of the imaging lens 31 of the imaging apparatus 1 faces.

The main control unit 21 controls the operation of each part of the imaging apparatus 1. The main control unit comprises, for example, a CPU and a memory. The main control unit 21 enables various functions, for example, when the CPU reads and executes a program stored in the memory. For example, the main control unit 21 functions as an operation judging unit 51, an imaging control unit 52, a focus control unit 53, a recording control unit 54, a display control unit 55, and a reinforcing bar measurement unit 56.

The operation judging unit 51 judges the operation input by the operation unit 15. That is, the operation judging unit 51 recognizes the kind of operation indicated by the operation unit 15. The operation judging unit 51 also recognizes the touched position of the display panel 41 on the basis of the touch position signal input from the touch sensor 15*a* of the operation unit 15.

The imaging control unit 52 controls each part to perform an operation to acquire an image. For example, the imaging control unit 52 inputs a control signal to the lens control unit 33 of the lens 10, and thereby causes the lens control unit 33 to drive the diaphragm mechanism 32. Moreover, the imaging control unit 52 drives the shutter unit 11 to perform an imaging action to take an image.

The imaging control unit 52 controls the acquisition of image data that can be displayed as a through-image by the imaging unit. For example, the imaging control unit 52 controls the signal processing unit 13 to read the image signal generated by the image pickup device 12 at a preset period.

The imaging control unit 52 may be configured to perform, for example, the automatic exposure (AE) processing, white balance (WB) adjustment processing, various other processing.

The focus control unit 53 performs the automatic focus (AF) processing by searching for a focus state in which a given subject in a search region (AF area) is in focus, on the basis of the light rays which have passed through the imaging lens 31. When performing contrast AF, the focus control unit 53 drives the focus lens in the optical axis direction and acquires an image, calculates a blur evaluation value of the acquired image in the search region, and estimates a focus position on the basis of the increase or decrease of the evaluation value. When performing phase contrast AF, the focus control unit 53 estimates a focus position on the basis of the distance between the figures of the subject that is a focus target in image data obtained by a first focus pixel and a second focus pixel on the imaging surface. The focus control unit 53 drives the focus lens of the imaging lens 31 to dispose the focus lens at the focus position, and can thereby obtain the focus state.

The recording control unit 54 comprises an intermediate buffer which transitorily records an image. The recording control unit 54 sequentially records the image acquired by the imaging action in the intermediate buffer. The recording control unit 54 forms the image recorded in the intermediate buffer into a file, and writes the file into the recording medium M attached to the memory I/F 17. The recording control unit 54 also writes the bar arrangement information generated by later-described processing into the recording medium M attached to the memory I/F 17.

The display control unit 55 controls display processing by the display unit 16. For example, the display control unit 55 displays a screen on the display device of the display unit 16 by inputting the image data to the display unit 16. For example, the display control unit 55 displays a still image on the display unit 16 by inputting the image data acquired by the imaging action to the display unit 16. The display control unit 55 also displays the through-image on the display unit 16 by inputting the image data successively acquired by the imaging unit to the display unit 16.

Furthermore, the display control unit 55 generates OSD data for displaying, on the display unit 16, an on-screen display (OSD) including various indications such as icons and characters on the basis of, for example, various setting information and the state of the imaging apparatus 1. For example, the display control unit 55 generates OSD data for displaying, on the display device of the display unit 16, a photography mode of the imaging apparatus 1, the various setting information, a battery remaining charge amount, the number of obtainable photographs, the photographable time, and the AF area. The display control unit 55 inputs, to the display unit 16, image data on which the OSD based on the OSD data is superimposed.

The reinforcing bar measurement unit 56 is a measurement unit which measures information regarding the target to acquire a measurement result. The reinforcing bar measurement unit 56 measures the dimensions of, for example, the reinforcing bars as the target. For example, the reinforcing bar measurement unit 56 performs reinforcing bar measurement processing for measuring the diameters and interval of the reinforcing bars. First, the reinforcing bar measurement unit 56 sends, in response to an operation, an instruction to the imaging control unit 52 to acquire a focus image in which the main reinforcements 3 that constitute the structure 2 are in focus. The reinforcing bar measurement unit 56 performs image acquiring processing for correcting the acquired focus image to generate a measurement image. The reinforcing bar measurement unit 56 then performs measurement processing for measuring the diameters of the main reinforcements 3 and the lateral ties 4 that constitute the structure 2, the interval between the main reinforcements 3, the interval between the lateral ties 4, and the number of the main reinforcements 3 on the basis of the measurement image to generate a measurement result. The reinforcing bar measurement unit 56 then performs alteration prevention processing for generating alteration prevention data on the basis of the focus image and the measurement image, and associating the focus image, the measurement image, the alteration prevention data, and the measurement result into a file form. Thus, the reinforcing bar measurement unit 56 can prevent the alterations of the focus image and the measurement image.

The reinforcing bar measurement unit 56 detects, as a subject, the reinforcing bars that are shown in the image acquired by the imaging unit. For example, the reinforcing bar measurement unit 56 detects the reinforcing bars that are shown in the image by using spatial recognition, pattern recognition, or object recognition. Specifically, the reinforcing bar measurement unit 56 detects a bar-shaped object by detecting a straight line from the image, and specifies the detected bar-shaped object as a target reinforcing bar which is a focus target. Thus, the reinforcing bar measurement unit 56 can detect the main reinforcements 3 and the lateral ties 4 that are shown in the image. When multiple reinforcing bars are shown in the image, the reinforcing bar measurement unit 56 specifies one of the reinforcing bars as a target reinforcing bar. The reinforcing bar measurement unit 56 may be configured to specify, as target reinforcing bars, multiple reinforcing bars which are arranged on the same plane and which are at an equal subject distance. The reinforcing bar measurement unit 56 may otherwise be configured detect reinforcing bars on the basis of the colors or designs.

The main control unit 21 stores, for example, a reinforcing bar measurement application (reinforcing bar measurement program) for the measurement of reinforcing bars in a ROM. The main control unit 21 enables various functions of the reinforcing bar measurement unit 56 by executing the reinforcing bar measurement application. The reinforcing bar measurement unit 56 comprises functional blocks such as an information acquiring unit 61, an image correction unit 62, a diameter calculation unit 63, an interval calculation unit 64, a number acquisition unit 65, an alteration prevention processing unit 66, a bar arrangement information processing unit 67, and a warning unit 68.

The information acquiring unit 61 acquires data regarding a target. For example, the information acquiring unit 61 acquires a subject distance at which the imaging lens 31 is focused on the target reinforcing bars, a figure distance, a focus distance, and a taken focus image. The information acquiring unit 61 acquires a subject distance and a figure distance for each focus image. The information acquiring unit 61 may be configured to calculate the figure distance on the basis of the subject distance and the focus distance.

The information acquiring unit 61 accesses the server by the communication unit 18 to acquire design information for each construction case. The information acquiring unit 61 thereby acquires a reinforcing bar layout diagram showing the arrangement of the reinforcing bars that constitute the structure 2 for each part. The information acquiring unit 61 may be configured to read the design information stored in the recording medium M instead of acquiring the design information from the server 5.

The image correction unit 62 functions as an information correction unit which corrects the data acquired by the information acquiring unit 61 to generate corrected data for measuring information regarding the target. For example, the image correction unit 62 generates a measurement image as corrected data by performing a geometrical correction on the focus image. For example, the image correction unit 62 corrects the focus image on the basis of the relation between the optical axis of the imaging lens 31 and the target reinforcing bar at the time of the acquisition of the focus image, and generates a measurement image. More specifically, the image correction unit 62 generates a measurement image by making a keystone correction of the focus image on the basis of the angle between the optical axis of the imaging lens 31 and the extending direction of the target reinforcing bar at the time of the acquisition of the focus image and on the basis of the subject distance.

The diameter calculation unit 63 calculates the diameter of the target reinforcing bar on the basis of the measurement image, the subject distance, and the figure distance. First, the diameter calculation unit 63 calculates the width of the figure of the target reinforcing bar on the imaging surface on the basis of the measurement image. Specifically, the diameter calculation unit 63 calculates the product of the number of pixels of the target reinforcing bar in the measurement image in the width direction and the pitch of the pixels as the width of the figure of the target reinforcing bar on the imaging surface. The diameter calculation unit 63 also calculates the ratio (figure magnification) of the figure distance to the subject distance. The diameter calculation unit 63 calculates, as the diameter of the target reinforcing bar, the product of the width of the figure of the target reinforcing bar on the imaging surface and the reciprocal of the figure magnification. The diameter calculation unit thereby calculates the diameters of the main reinforcements 3 and the lateral ties 4 that are shown in the measurement image. The diameter calculation unit 63 may be configured to add, to the measurement image, an indicator that indicates which position is measured as the diameter of the main reinforcement 3 in the measurement image.

The interval calculation unit 64 calculates the interval between the target reinforcing bars on the basis of the measurement image, the subject distance, and the figure distance. First, the interval calculation unit 64 calculates the interval between the target reinforcing bars on the imaging surface on the basis of the measurement image. Specifically, the interval calculation unit 64 calculates the product of the number of pixels in the interval between the target reinforcing bars in the measurement image and the interval of the pixels as the interval between the target reinforcing bars on the imaging surface. The interval calculation unit 64 calculates, as the interval between the target reinforcing bars, the product of the interval between the target reinforcing bars on the imaging surface and the reciprocal of the figure magnification. Thus, the interval calculation unit 64 thereby calculates the interval between the main reinforcements 3 and the interval between the lateral ties that are shown in the measurement image. The interval calculation unit 64 may be configured to add, to the measurement image, an indicator that indicates which position is measured as the interval between the main reinforcements 3 in the measurement image.

The number acquisition unit 65 acquires the number of the main reinforcements 3 on the basis of the number of the reinforcing bars included in the measurement image. That is, the number acquisition unit 65 acquires the number of the reinforcing bars which have been detected as subjects from the measurement image as described above.

The number acquisition unit 65 associates the measured reinforcing bars with the reinforcing bars on the reinforcing bar layout diagram. For example, the number acquisition unit 65 can detect the main reinforcements 3 that have not been measured by associating the measured target reinforcing bars with each of the reinforcing bars in the reinforcing bar layout diagram acquired by the information acquiring unit 61. The number acquisition unit 65 may associate the measurement results of the diameter of each reinforcing bar and the interval between the reinforcing bars in the reinforcing bar layout diagram with the reinforcing bar layout diagram.

The number acquisition unit 65 associates the measured part with a list of parts shown by the design information. For example, the number acquisition unit 65 can detect a part that has not been measured by associating a part which has completed the measurement with the list of parts shown by the design information.

The alteration prevention processing unit 66 performs the alteration prevention processing. The alteration prevention processing unit 66 prevents the alterations of the focus image and the measurement image by associating the focus image with the measurement image which is a corrected image obtained by the correction. For example, the alteration prevention processing unit 66 generates the alteration prevention data on the basis of the focus image and the measurement image. For example, the alteration prevention processing unit 66 acquires a hash value as the alteration prevention data by inputting the focus image and the measurement image to a predetermined hash function. The hash function may be a general hash function or may be a cryptographic hash function such as SHA-1 or SHA-2. The alteration prevention processing unit 66 may be configured to acquire a second hash value as the alteration prevention data by inputting, to the second hash value, a first hash value which is obtained by inputting the focus image and the measurement image to a first hash function. The alteration prevention processing unit 66 may be configured to generate the alteration prevention data by using some other alteration detection method instead of the hash function.

The bar arrangement information processing unit 67 associates information acquired by the information acquiring unit 61 with the corrected data. For example, the bar arrangement information processing unit 67 generates the bar arrangement information by associating the image, the measurement result, and the alteration prevention data into a file form. The bar arrangement information is information including a picture and a measurement result of each part, and is intended to preserve the construction state of each part of a building. The bar arrangement information processing unit 67 associates, for example, the focus image, the measurement image, the measurement result, the alteration prevention data, and target information that have been acquired for each part shown by the design information into a file form as the bar arrangement information. That is, the bar arrangement information processing unit 67 associates the focus image, the measurement image, the measurement result, the hash value, and the target information into a file form as the bar arrangement information. The target information includes given information selected from the group consisting of, for example, a construction name, a construction place, a part name, and a reinforcing bar layout diagram for each construction case. Moreover, the bar arrangement information processing unit 67 may be configured to add, to the bar arrangement information, for example, information indicating the setting of the imaging apparatus 1 at the time of the acquisition of the focus image, an identifier (e.g. SSID, a MAC address) of the imaging apparatus 1, the date and time of the acquisition of the image, and information on a photographer as additional information. In this case, the bar arrangement information processing unit adds the information on the photographer to the bar arrangement information on the basis of preset information. The recording control unit 54 records the bar arrangement information generated by the bar arrangement information processing unit 67 in the recording medium M attached to the memory I/F 17.

The warning unit 68 outputs various warnings for the acquisition of the focus image. The warning unit 68 outputs a warning, for example, by performing an alert display on the display unit 16. The warning unit 68 may output a warning by audio output when the imaging apparatus 1 comprises a speaker.

The warning unit 68 outputs a warning when the inclinations of the housing of the imaging apparatus 1 in the roll direction and the yaw direction are detected by the inclination detection unit 20 at the time of image acquisition. For example, the warning unit 68 outputs, as an alert display, a display which urges to modify the inclination in the roll direction and the inclination in the yaw direction when the inclinations of the housing of the imaging apparatus 1 in the roll direction and the yaw direction are detected.

The warning unit 68 also outputs an alert which outputs a warning indicating that there are undetected reinforcing bars when the number of reinforcing bars shown in the reinforcing bar layout diagram does not correspond to the number of reinforcing bars detected as subjects from the focus image.

When the width of the figure of the target reinforcing bar in the focus image is less than a preset width, the warning unit 68 judges that the measurement of the diameter of the target reinforcing bar is impossible, and the warning unit 68 outputs a warning that urges to bring the imaging unit closer to the target reinforcing bar. In general, a reinforcing bar is formed to have a diameter of 7 mm or more. There are generally types of reinforcing bars so that the diameters increase by 3 mm according to the types. Thus, in the imaging apparatus 1, the image pickup device 12 and the imaging lens 31 are configured to detect a difference of 3 mm with sufficient accuracy.

Next, correction processing by the image correction unit 62 is described.

Figure 3:
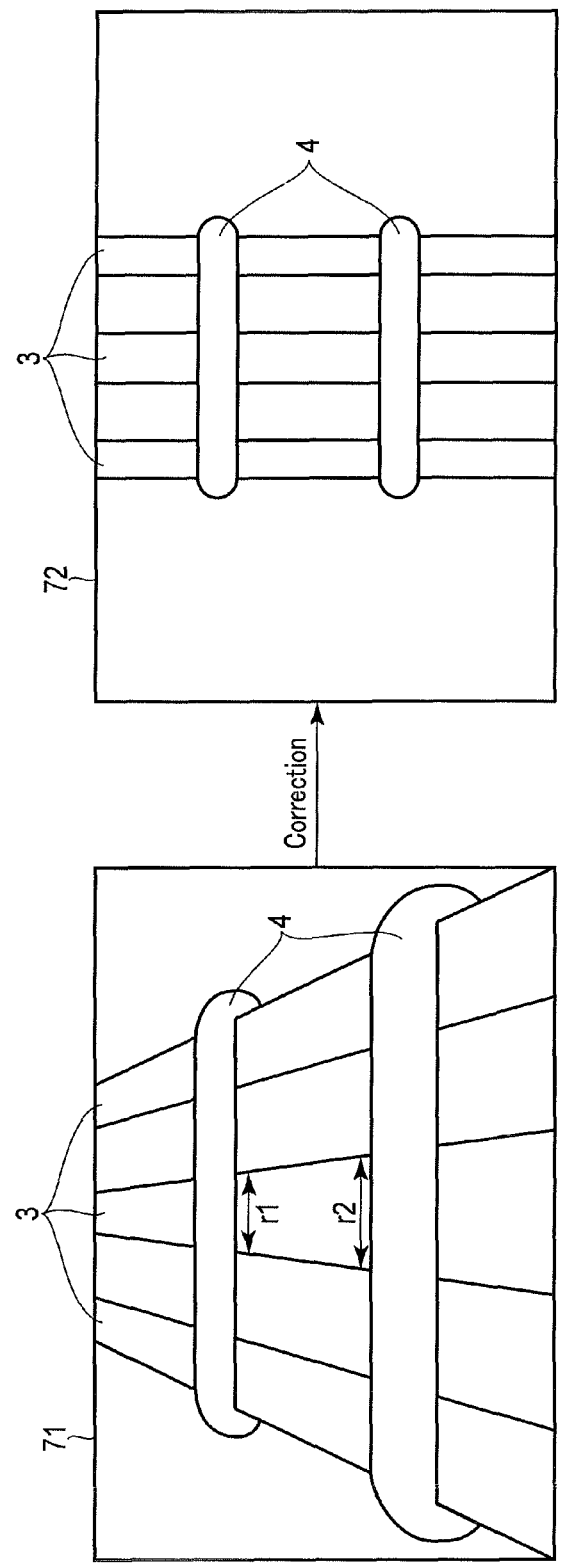
FIG. 3 is a diagram illustrating an example of an imaging result and an image correction by the imaging apparatus according to one embodiment.
Figure 6:
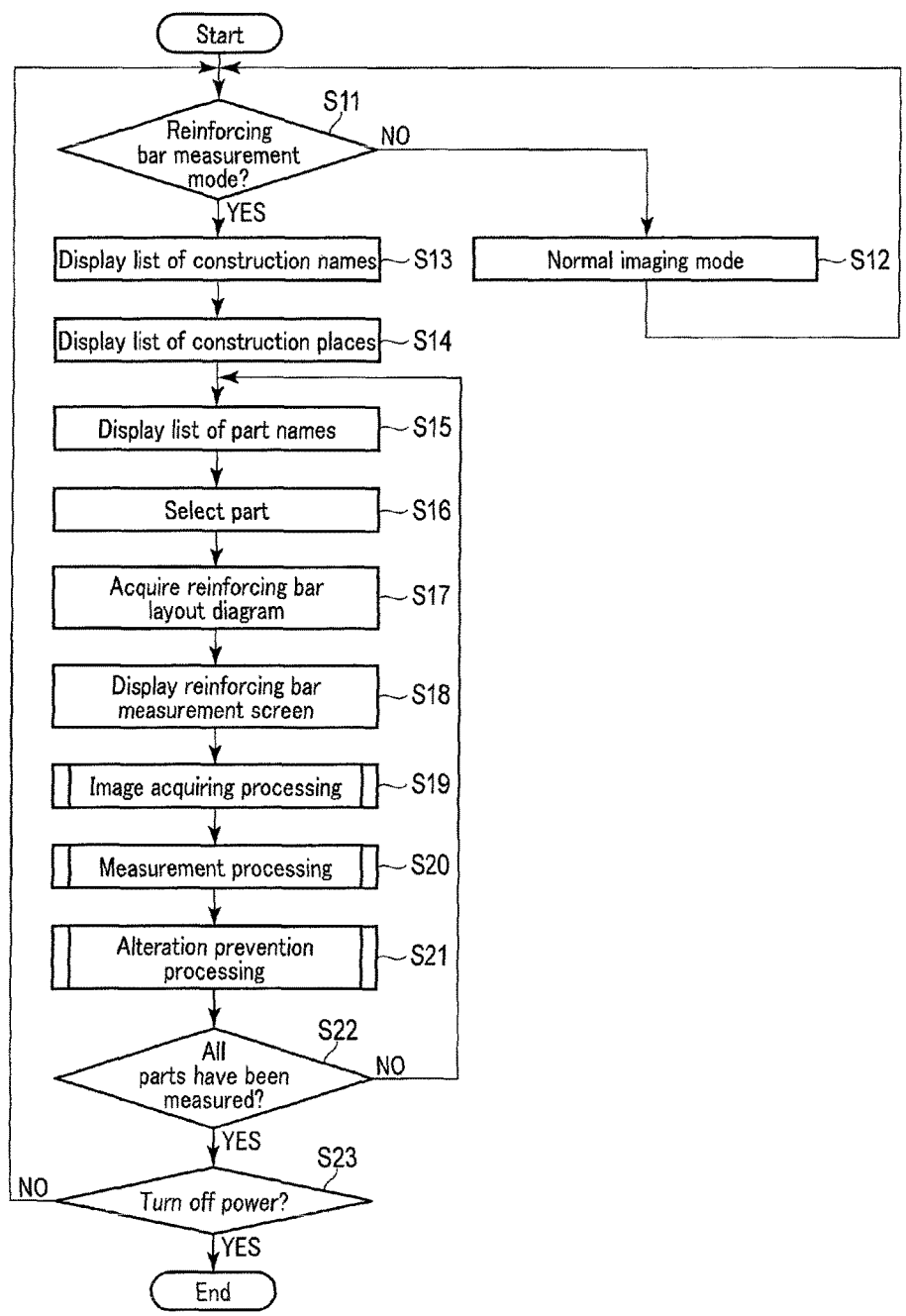
FIG. 6 is a diagram illustrating an example of reinforcing bar measurement processing by the imaging apparatus according to one embodiment.

When multiple main reinforcements 3 are provided on the same plane (arrangement plane), the figure of the main reinforcements 3 that are shown in the focus image is deformed into a trapezoidal shape as shown in FIG. 3 by the angle between the arrangement plane and the optical axis of the imaging lens 31. A focus image 71 in FIG. 3 shows an example in which the figure of the main reinforcements 3 is deformed into a trapezoidal shape. When the main reinforcements 3 are used in a column, the main reinforcements 3 are provided to extend in the vertical direction, so that the arrangement plane is a plane including the vertical direction and the direction (arrangement direction) in which the main reinforcements 3 are arranged. When the optical axis of the imaging lens 31 is inclined upward in the pitch direction, that is, in a tilt state, the figure of the main reinforcements 3 is deformed into a trapezoidal shape in which the lower side is wider than the upper side as in the focus image 71 in FIG. 3. When the optical axis of the imaging lens 31 is inclined downward in the pitch direction, that is, in a tilt-shift state, the figure of the main reinforcements 3 is deformed into a trapezoidal shape in which the upper side is wider than the lower side.

FIG. 4 and FIG. 5 are explanatory diagrams illustrating the imaging surface of the image pickup device 12, the imaging lens 31, and the main reinforcements 3 in the tilt state. When the imaging apparatus 1 is in the tilt state, the subject distance varies depending on the position on the main reinforcement 3 as shown in FIG. 4. Therefore, as shown in FIG. 5, the size of the figure of the main reinforcement 3 shown in the focus image varies according to the subject distance. Specifically, the figure of the main reinforcement 3 having a diameter R at a position of a subject distance A1 is formed into an image with a width r1 on the imaging surface. The figure of the main reinforcement 3 at a position of a subject distance A2 shorter than the subject distance A1 is formed into an image with a width r2 greater than the subject distance A1 on the imaging surface.

The image correction unit 62 generates a measurement image 72 by making a keystone correction of the focus image 71 on the basis of an angle $\alpha$ between the optical axis of the imaging lens 31 inclined in the pitch direction and the arrangement plane and on the basis of the subject distance. For example, the image correction unit 62 generates the measurement image 72 by a coordinate conversion of the whole focus image 71 on the basis of the angle $\alpha$ and the subject distance. When recognizing the angle $\alpha$ and the subject distance, the image correction unit 62 can recognize by the angle $\alpha$ the degree of deformation that is shown because the main reinforcements 3 are arranged on the arrangement plane. The image correction unit 62 acquires the measurement image 72 at an angle similar to that of the image acquired from the direction that intersects at right angles with the arrangement plane by correcting and thereby canceling the distortion of the subject figure attributed to the angle $\alpha$ in the focus image 71. It is thus possible to improve the reliability of the measurement result by generating a measurement image having a small distortion and recording the measurement image together with the focus image 71.

The image correction unit 62 is not limited to the configuration which makes a keystone correction of the focus image 71 on the basis of the angle $\alpha$ and the subject distance. The image correction unit 62 may have a configuration which corrects the focus image 71 to generate the measurement image 72 by some other method. For example, the image correction unit 62 may be configured to generate the measurement image 72 by deforming the widths of figures at two points on the main reinforcement 3 and the whole focus image 71 on the basis of the ratio of subject distances acquired at the two points.

The above-mentioned "focus image (focus image 71)" may be subjected to necessary corrections. For example, the image correction unit 62 may be configured to treat, as the focus image 71, an image which has been subjected to general corrections that are normally made for the purpose of photography (e.g. a distortion correction for correcting lens distortion, a dimming correction for correcting the dimming around the angle of field, a WB adjustment, and a noise reduction). The image correction unit 62 may also be configured to treat an uncorrected image as the focus image 71, and make the above-mentioned general corrections together with the above-mentioned keystone correction.

Next, an example of the reinforcing bar measurement application is described.

The main control unit 21 of the imaging apparatus 1 executes the reinforcing bar measurement application in response to a predetermined operation. For example, the main control unit 21 executes the reinforcing bar measurement application on the basis of the operation of the cross button 15c, the operation of an unshown mode dial, or an external instruction via the communication unit 18.

On the basis of the design information, the main control unit 21 displays, on the display unit 16, a screen showing a list of construction places shown by the design information, and a screen showing a list of parts corresponding to the construction places. For example, the main control unit 21 displays a map of the construction place, and displays symbols that are selectable by the operation of the operation unit 15 at positions to the respective parts on the map. When a symbol is selected, the main control unit 21 judges that a part corresponding to the selected symbol is selected.

The main control unit 21 displays, on the display unit 16, a reinforcing bar measurement screen for measuring the selected part. The main control unit 21 executes the image acquiring processing, the measurement processing, and the alteration prevention processing by the reinforcing bar measurement unit 56 in response to the operation in the display of the reinforcing bar measurement screen.

Next, an example of the reinforcing bar measurement processing is described with reference to FIG. 6 to FIG. 10.

FIG. 6 to FIG. 10 show an example of the operation of the imaging apparatus 1. The main control unit 21 judges whether the imaging apparatus 1 is operating in a reinforcing bar measurement mode (step S11). That is, the main control unit 21 judges whether the imaging apparatus 1 is operating in the reinforcing bar measurement mode by executing the reinforcing bar measurement application. When judging that the imaging apparatus 1 is not operating in the reinforcing bar measurement mode (step S11, NO), the main control unit 21 performs processing in a normal imaging mode (step S12). For example, the main control unit may be configured to acquire coordinates for each construction name from, for example, the design information, recognize the coordinates of the imaging apparatus 1 by the GPS, and thereby automatically execute the reinforcing bar measurement application when the difference between the coordinates for each construction name and the coordinates of the imaging apparatus 1 is less than a preset difference.

When judging that the imaging apparatus 1 is operating in the reinforcing bar measurement mode (step S11, YES), the main control unit 21 displays, by the display unit 16, a screen showing the list of construction names (step S13). When a construction name is selected, the main control unit 21 displays, by the display unit 16, a screen showing the list of construction places that is shown by the design information corresponding to the selected construction name so that a construction place can be selected by the operation of the operation unit 15 (step S14).

When a construction place is selected, the main control unit 21 displays, by the display unit 16, a screen showing the list of parts corresponding to the selected construction place so that a part can be selected by the operation of the operation unit 15 (step S15).

The main control unit 21 selects one of the displayed parts in accordance with an operation input (step S16). The main control unit 21 may be configured to acquire coordinates for each part corresponding to a construction place from, for example, the design information, recognize the coordinates of the imaging apparatus 1 by the GPS, and thereby recognize the distance between each part and the imaging apparatus 1 and select a part closest to the imaging apparatus 1. When a part is selected, the main control unit 21 reads the reinforcing bar layout diagram corresponding to the selected part (step S17). The main control unit 21 uses the read reinforcing bar layout diagram to display the above-mentioned reinforcing bar measurement screen by the display unit 16 (step S18).

Figure 7:
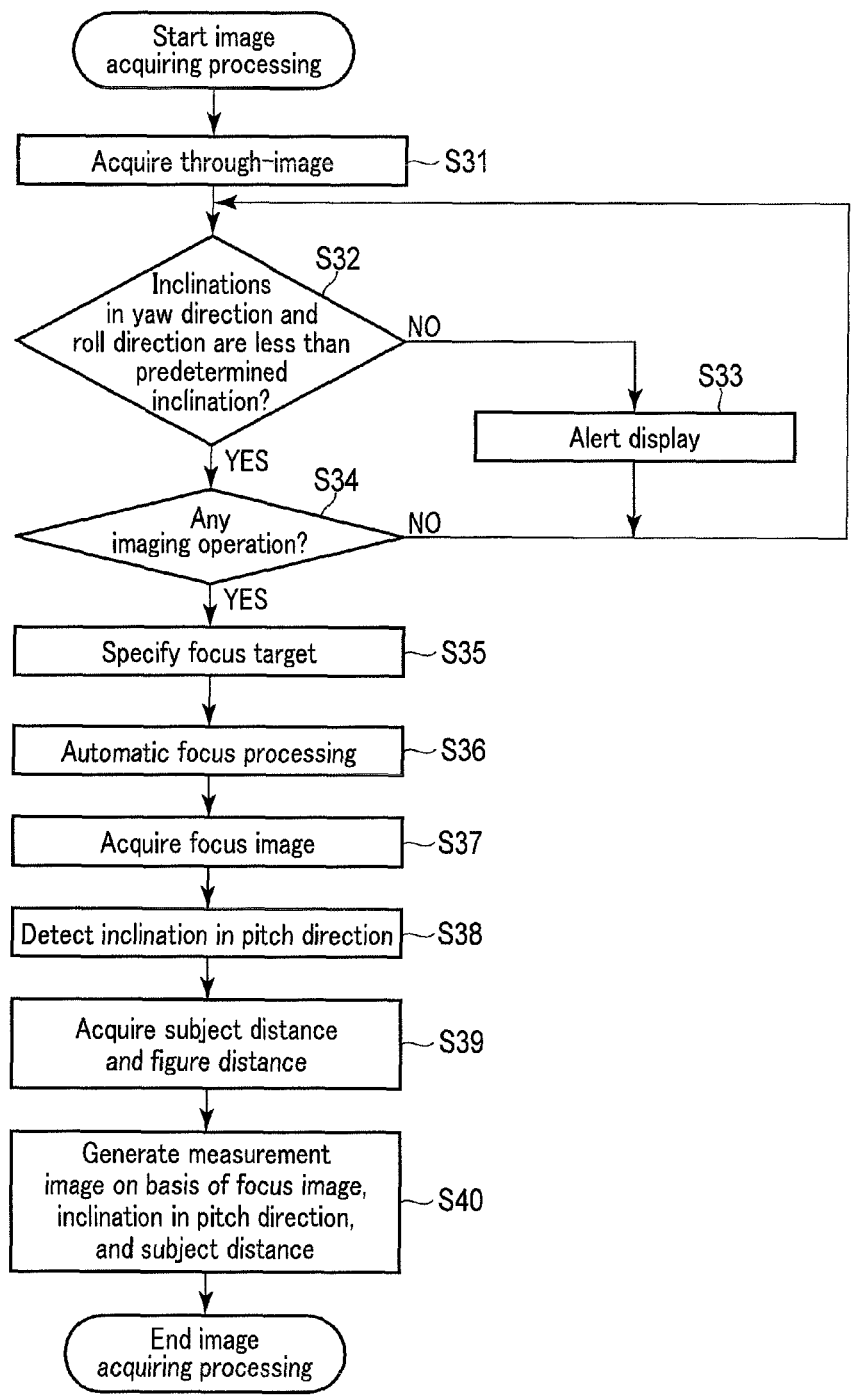
FIG. 7 is a diagram illustrating an example of image acquiring processing by the imaging apparatus according to one embodiment.

The main control unit 21 executes the image acquiring processing in accordance with an operation in the reinforcing bar measurement screen display (step S19). FIG. 7 shows an example of the image acquiring processing by the main control unit 21. First, the main control unit 21 acquires an image as a sequential through-image in the reinforcing bar measurement screen display (step S31). The main control unit 21 recognizes the pose of the housing of the imaging apparatus 1 at the time of the through-image acquisition on the basis of the detection result by the inclination detection unit 20, and thereby judges whether each of the inclinations in the roll direction and the yaw direction is less than a predetermined inclination (step S32). When judging that each of the inclinations in the roll direction and the yaw direction is not less than the predetermined inclination (step S32, NO), the main control unit 21 outputs an alert display which urges to modify the inclinations in the roll direction and the yaw direction (step S33), and proceeds to the processing in step S31.

Figure 8:
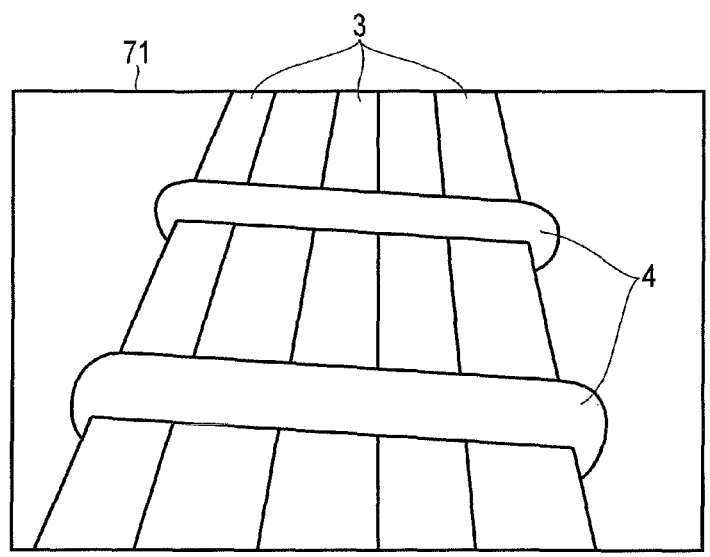
FIG. 8 is a diagram illustrating an example of an imaging result by the imaging apparatus according to one embodiment.

For example, when the housing of the imaging apparatus 1 at the time of the through-image acquisition is inclined in the roll direction and the yaw direction, the subject distance of the reinforcing bars that are shown in the image as shown in FIG. 8 varies between the right and left of the image. Thus, the correction of the image by the image correction unit 62 is difficult. Therefore, the main control unit 21 outputs an alert when each of the inclinations in the roll direction and the yaw direction is equal to or more than the predetermined inclination as shown in step S33, and the main control unit 21 urges the user to modify the inclinations of the housing of the imaging apparatus 1 in the roll direction and the yaw direction.

When judging that each of the inclinations in the roll direction and the yaw direction is less than the predetermined inclination (step S32, YES), the main control unit 21 judges whether an imaging operation is input (step S34). When judging that no imaging operation is input (step S34, NO), the main control unit 21 proceeds to the processing in step S31. When judging that an imaging operation is input (step S34, YES), the main control unit 21 performs focus image acquiring processing for acquiring a focus image in which the main reinforcements 3 that constitute the structure 2 are in focus. First, the main control unit 21 detects, as subjects, the reinforcing bars that are shown in the through-image, and specifies a target reinforcing bar which is a reinforcing bar targeted for focusing among the detected main reinforcements 3 (step S35).

The main control unit 21 performs automatic focus processing for focusing on the target reinforcing bar by driving the imaging lens 31 (step S36). The main control unit 21 acquires a focus image by performing an imaging action while the target reinforcing bar is in focus (step S37). The main control unit 21 recognizes the pose of the housing of the imaging apparatus 1 at the time of the acquisition of the focus image on the basis of the detection result by the inclination detection unit 20. The main control unit 21 thereby detects the inclination of the housing of the imaging apparatus 1 at the time of the acquisition of the focus image in the pitch direction (step S38). Further, the main control unit 21 acquires a subject distance and a figure distance in accordance with the state of the imaging lens 31 at the time of the acquisition of the focus image (step S39). The main control unit 21 may add the acquired subject distance and figure distance to the focus image.

The main control unit 21 generates a measurement image by correcting the focus image on the basis of the inclination in the pitch direction and subject distance (step S40). That is, the main control unit 21 corrects the distortion of the focus image attributed to the inclination in the pitch direction to generate a measurement image which is a corrected image of the focus image, and finishes the image acquiring processing. For example, the main control unit 21 transitorily records information such as the focus image, the measurement image, the subject distance, and the figure distance in the memory of the main control unit 21.

Figure 9:
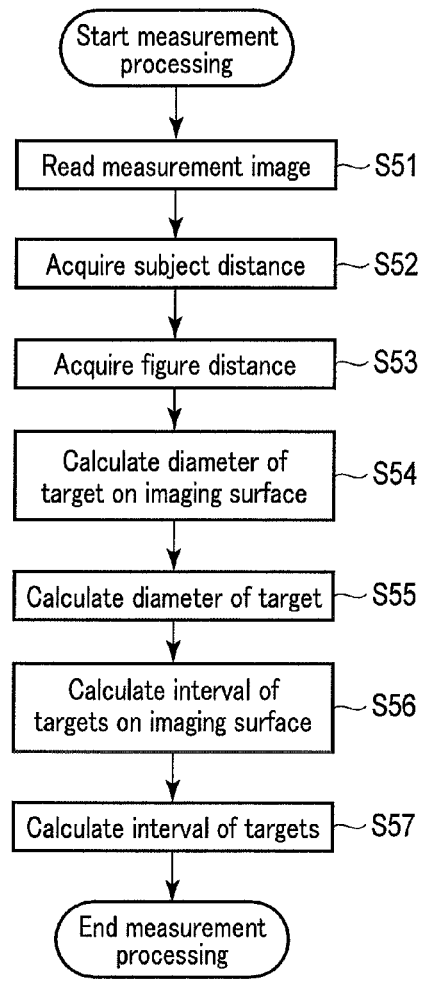
FIG. 9 is a diagram illustrating an example of measurement processing by the imaging apparatus according to one embodiment.

The main control unit 21 then performs the measurement processing (step S20). FIG. 9 shows an example of the measurement processing by the main control unit 21. First, the main control unit 21 reads, from the memory, the measurement image acquired by the image acquiring processing (step S51). The main control unit 21 acquires the subject distance at the time of the acquisition of the focus image used for the generation of the read measurement image (step S52). The main control unit 21 also acquires the figure distance at the time of the acquisition of the focus image used for the generation of the read measurement image (step S53).

The main control unit 21 calculates the width of the figure of the target reinforcing bar on the imaging surface on the basis of the width of the figure of the target reinforcing bar in the measurement image (step S54). The main control unit 21 calculates the diameter of the target reinforcing bar on the basis of the subject distance and the figure distance corresponding to the measurement image and the width of the figure of the target reinforcing bar on the imaging surface (step S55). That is, the main control unit 21 calculates a figure magnification which is the ratio of the figure distance to the subject distance, and calculates, as the diameter of the target reinforcing bar, the product of the width of the figure of the target reinforcing bar and the reciprocal of the figure magnification.

On the basis of the interval of the figure of the target reinforcing bar in the measurement image, the main control unit 21 calculates the interval of the figure of multiple target reinforcing bars on the imaging surface (step S56). The main control unit 21 calculates the actual interval between the target reinforcing bars on the basis of the subject distance and the figure distance corresponding to the measurement image and the interval of the figure of the target reinforcing bars on the imaging surface (step S57). That is, the main control unit 21 calculates, as the interval between the target reinforcing bars, the product of the interval of the figures of the target reinforcing bars and the reciprocal of the figure magnification, and finishes the measurement processing. For example, the main control unit 21 transitorily records, in the memory of the main control unit 21, measurement results such as the diameter of each of the target reinforcing bars and the interval between the target reinforcing bars.

The main control unit 21 then performs the alteration prevention processing (step S21). FIG. 10 shows an example of the alteration prevention processing by the main control unit 21. First, the main control unit 21 uses a hash function to calculate a hash value from the focus image and the measurement image acquired by the image acquiring processing (step S61). That is, the main control unit 21 reads the focus image and the measurement image from the memory, and inputs the read focus image and measurement image to the hash function to generate one hash value.

The main control unit 21 generates bar arrangement information by associating the focus image, the measurement image, the measurement result, the hash value, and the target information into a file form (step S62). That is, the main control unit 21 reads the focus image, the measurement image, and the measurement result from the memory, and associates the hash value calculated in step S62 with the target information acquired from, for example, the design information to generate a file of the bar arrangement information.

The main control unit 21 records the generated bar arrangement information in the recording medium M attached to the memory I/F 17 (step S63), and finishes the alteration prevention processing.

After the end of the alteration prevention processing, the main control unit 21 refers to the design information and judges whether all the parts included in the construction place selected in step S14 have been measured by the processing described above (step S22). That is, the main control unit 21 refers to the design information and judges whether bar arrangement information for all the parts included in the construction place selected in step S14 has been generated. When judging that there are parts that have not been measured yet (step S22, NO), the main control unit 21 returns to step S15, and displays a screen showing the list of parts corresponding to the selected construction place by the display unit 16.

When judging that all the parts have been measured (step S22, YES), the main control unit 21 judges whether to turn off power (step S23). That is, the main control unit judges whether, for example, a power button in the operation unit 15 has been operated and an instruction to turn off power has been input by the operation unit 15. When judging that power is to be turned off (step S23, YES), the main control unit 21 turns off the power of the imaging apparatus 1 and finishes the processing. When judging that power is not to be turned off (step S23, NO), the main control unit 21 returns to step S11.

A device (e.g. referred to as a verification device) for judging whether the bar arrangement information is valid generates the alteration prevention data by a method similar to that of the imaging apparatus 1 on the basis of the focus image and the measurement image of the bar arrangement information. For example, the verification device uses the focus image and the measurement image as inputs to calculate a hash value by using the same hash function as that of the imaging apparatus 1. The verification device compares the calculated hash value with the hash value in the bar arrangement information. When the calculated hash value corresponds to the hash value in the bar arrangement information, the verification device judges that the focus image and the measurement image of the bar arrangement information are unaltered and valid images. When the calculated hash value does not correspond to the hash value in the bar arrangement information, the verification device judges that one or both of the focus image and the measurement image of the bar arrangement information are altered images.

The imaging apparatus 1 having the configuration described above acquires a focus image, and corrects the focus image to generate a measurement image. The imaging apparatus 1 measures the target reinforcing bars on the basis of the measurement image to acquire a measurement result. The imaging apparatus 1 records the focus image and the measurement image in association with each other. It is thus possible to ensure the validity of the measurement image which is an image after correction. The imaging apparatus 1 records the focus image and the measurement image in association with each other. The imaging apparatus 1 then records the focus image, the measurement image, the measurement result, and the alteration prevention data in association with one another. According to this configuration, when at least one of the focus image and the measurement image is altered, the hash value generated from the altered focus image and measurement image does not correspond to the recorded hash value. It is therefore possible to prevent the alteration of the focus image or the measurement image. Thus, it is possible to further ensure the validity of the measurement image which is the image after correction. It is also possible to prevent the alteration of the image.

Alteration can be more difficult when the main control unit 21 is configured to perform, as a series of operations, for example, processing for generating the measurement image from the focus image, and processing for generating the alteration prevention data from the focus image and the measurement image. That is, the generation of the measurement image from the focus image taken by the imaging action is the condition for performing the processing to generate the alteration prevention data so that the alteration prevention processing unit 66 can prevent the image saved in the recording medium M from being used as the focus image to generate the measurement image. More specifically, it is possible to obtain the imaging apparatus 1 which makes alteration more difficult by mounting, on one chip such as an LSI, a processing circuit which performs the processing for generating the measurement image from the focus image taken by the imaging action, and the processing for generating the alteration prevention data from the focus image and the measurement image.

Although the alteration prevention processing unit 66 treats, as the alteration prevention data, the hash value calculated by inputting the focus image and the measurement image to the hash function in the example according to the embodiment described above, the alteration prevention processing unit 66 is not limited to this example. The alteration prevention processing unit 66 may be configured to acquire the alteration prevention data by separately inputting the focus image and the measurement image to the hash function. That is, the alteration prevention processing unit 66 may be configured to generate the alteration prevention data to be associated with the focus image by inputting the focus image to the hash function, and generate the alteration prevention data to be associated with the measurement image by inputting the measurement image to the hash function.

The alteration prevention processing unit 66 may be configured to generate the alteration prevention data for each piece of information to be formed into a file as the bar arrangement information. That is, the alteration prevention processing unit 66 may be configured to generate the alteration prevention data for associating with each piece of information by inputting the focus image, the measurement image, the measurement result, the target information, and additional information to the hash function.

Furthermore, the target for the generation of the alteration prevention data by the alteration prevention processing unit 66 is not limited to an image such as the focus image and the measurement image but may be anything. For example, the alteration prevention processing unit 66 may be configured to generate the alteration prevention data on the basis of multiple pieces of information to be formed into a file as the bar arrangement information. That is, the alteration prevention processing unit 66 may be configured to treat, as the alteration prevention data to be added to the bar arrangement information, a hash value which is obtained by inputting, for example, the focus image, the measurement image, the measurement result, the target information, and additional information to the hash function as one input. The alteration prevention processing unit 66 may also be configured to add, to each piece of information as the alteration prevention data, multiple hash values which are obtained by independently inputting the focus image, the measurement image, the measurement result, the target information, and additional information to the hash function.

Furthermore, the alteration prevention processing unit 66 may be configured to generate the alteration prevention data on the basis of multiple pieces of information when compiling multiple pieces of bar arrangement information into a construction picture regarding one building. That is, the alteration prevention processing unit 66 calculates a hash value by inputting multiple pieces of bar arrangement information to the hash function as one input. The main control unit 21 can form the obtained hash value and multiple pieces of bar arrangement information into a file to generate construction picture information, and thereby prevent the alterations of multiple pieces of bar arrangement information included in, for example, the construction picture information.

Although the alteration prevention processing unit 66 treats, as the focus image 71, the image obtained by one photography result in the above processing in the example described above, the alteration prevention processing unit 66 is not limited to this configuration. For example, the alteration prevention processing unit 66 may be configured to treat, as the focus image 71, a composite image in which images acquired by multiple photography are composed. Although the focus image is referred to, strict focusing is not necessary if the image can be used for measurement. Therefore, an image obtained by pan focus may also be used.

The bar arrangement information processing unit 67 has only to be configured to record the bar arrangement information in any form (or file format). However, the bar arrangement information processing unit 67 preferably records the bar arrangement information as a single file. This can prevent various information (various auxiliary information such as the measurement result, the hash value, and the target information, and images such as the focus image and the measurement image) in the bar arrangement information from being broken up (disassociated as a result).

The image of the bar arrangement information has only to be in any file format, and is preferably in a general image file format such as JPEG or TIFF. For example, the bar arrangement information processing unit 67 may be configured to record the focus image or the measurement image as the main image (main data) and record other images and the auxiliary information as meta data of the main image. That is, the bar arrangement information is configured as an image file having the focus image or the measurement image as the main image (main data) and having other images and the auxiliary information as the meta data, so that it is possible to obtain both the above-mentioned advantage of treating the bar arrangement information as a container and the convenience on the system or the network (i.e. simplification of file handling).

Because of a high affinity both on functional mounting and on a user interface, it is easier to mount the function of acquiring the bar arrangement information on a general photography camera if the bar arrangement information has the above configuration. When the function of acquiring the bar arrangement information is mounted on a general photography camera, it is possible to expect the reduction of manufacturing costs resulting from mass production effect, and the improvement of applicability resulting from the high affinity of the user interface.

The previously described "bar arrangement information" may be separately recorded in multiple files instead of being recorded in a single file. For example, various information may be included in a folder as the multiple files. In this case as well, it is preferable to have an environment or a system in which the bar arrangement information is collectively treated without being broken up.

Although the image correction unit 62 generates the measurement image by making a keystone correction of the focus image in the embodiment described above, the image correction unit 62 is not limited to this configuration. The image correction unit. 62 may be configured to generate the measurement image by, for example, binarization processing, edge highlight processing, color conversion processing, or other image processing instead of the keystone correction of the focus image. The image correction unit 62 may also be configured to perform, for example, the binarization processing, the edge highlight processing, and the color conversion processing without making the keystone correction. Thus, the corrections by the image correction unit 62 include, for example, corrections necessary to obtain the measurement result and corrections which make it easier to obtain an accurate measurement result.

Although the column is described as an example of a part to be measured in the above embodiment, any part in which reinforcing bars are arranged in the same plane is possible; for example, a column, a beam, a floor face, or a wall. For example, when the floor face is a measurement target, the arrangement plane is a horizontal plane because the reinforcing bars built in the floor face are arranged along the horizontal plane. The main control unit 21 of the imaging apparatus 1 recognizes the angle between the optical axis of the imaging lens 31 and the arrangement plane on the basis of the inclination detected by the inclination detection unit 20. The main control unit 21 can generate the measurement image by correcting the focus image on the basis of the recognized angle and the subject distance based on the focus position. For other parts as well, the main control unit 21 recognizes the angle between the arrangement plane in which reinforcing bars are arranged and the optical axis of the imaging lens 31, and can generate the measurement image by correcting the focus image on the basis of the recognized angle and the subject distance based on the focus position.

Although the diameter of the reinforcing bar and the interval between the reinforcing bars are the measurement targets in the embodiment described above, the configuration is not limited to this configuration. The imaging apparatus 1 may be configured to measure the dimensions of a steel frame, a concrete column, a wall, a floor, a rail and a tie of a railroad, a pier, a bridge girder, or a flying buttress.

When the focus image, the measurement image, the measurement result, the target information, and the additional information are formed into a file as the bar arrangement information, the bar arrangement information has a high volume. Therefore, the main control unit 21 may be configured to generate the bar arrangement information in such a manner as to lock the focus image, the measurement result, and the target information that always need to be saved for the prevention of their deletion and to allow the deletion of other data.

For example, when it is ascertained by the verification device that the focus image and the measurement image of the bar arrangement information are unaltered and valid images, the volume of the bar arrangement information can be reduced by the deletion of the data that are not locked by the verification device. Thus, for example, when multiple pieces of bar arrangement information need to be saved as the construction picture information, the storage capacity can be reduced.

Although the lens control unit 33 is configured to detect the distance (subject distance) from the principal point of the imaging lens 31 to the subject which is the focus target and the distance (figure distance) from the principal point to the imaging surface of the image pickup device 12 by detecting the position (focus position) of the focus lens at the time of focusing according to the embodiment described above, the lens control unit 33 is not limited to this configuration. The information acquiring unit 61 may be configured to acquire a plurality of items of image data obtained by taking target reinforcing bars from different positions spaced at a predetermined interval, and calculate a distance (subject distance and figure distance) to the target reinforcing bars on the basis of the acquired plurality of items of image data. That is, the information acquiring unit 61 may be configured to acquire a plurality of items of image data regarding reinforcing bars including parallax, and calculate a distance to the target reinforcing bars on the basis of the acquired plurality of items of image data.

According to this configuration, the reinforcing bar measurement unit 56 measures the diameters, interval, etc. of the target reinforcing bars on the basis of the distance to the target reinforcing bars calculated from the plurality of items of image data regarding the reinforcing bars including parallax and the figures of the target reinforcing bars in the image data. For example, the reinforcing bar measurement unit 56 may be configured to measure the diameters, interval, etc. of the target reinforcing bars on the basis of the plurality of items of image data and the calculated distance, or may be configured to measure the diameters, interval, etc. of the target reinforcing bars on the basis of one of the plurality of items of image data and the calculated distance.

Even if the target reinforcing bar is focused, there may be unfocused regions because the depth of field does not cover the whole target reinforcing bar. In this case, the imaging apparatus 1 may be configured to perform sequential shooting while driving the focus lens, acquire multiple images from the target reinforcing bar, perform depth composition by use of the acquired images to generate a depth composite image, and corrects the depth composite image to generate a measurement image.

Figure 11:
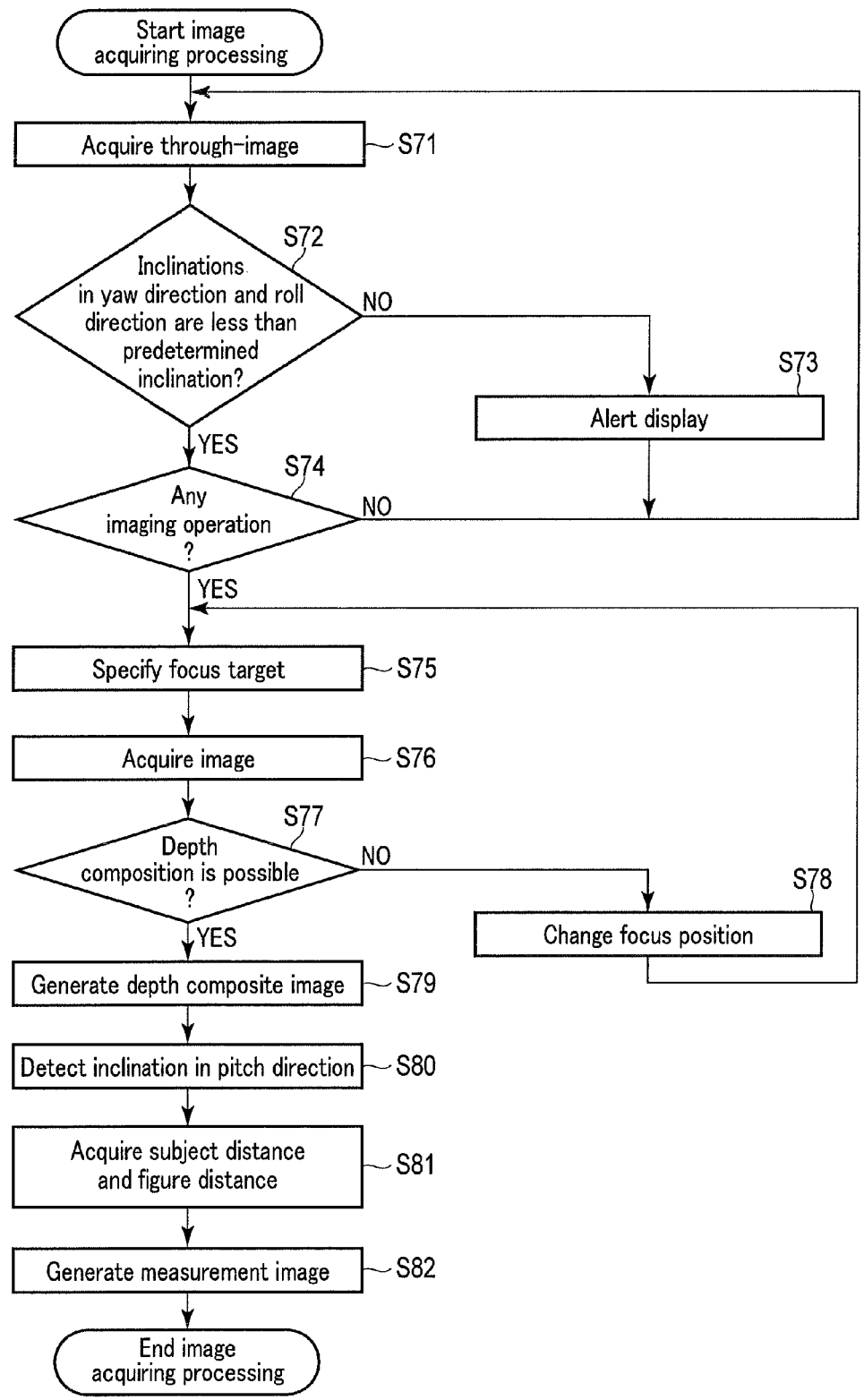
FIG. 11 is a diagram illustrating an example of image acquiring processing by an imaging apparatus according to another embodiment.

FIG. 11 shows another example of the image acquiring processing. Here, an example of the image acquiring processing for performing depth composition is described. The main control unit 21 sequentially acquires images as through-images in the reinforcing bar measurement screen display (step S71). The main control unit 21 recognizes the pose of the housing of the imaging apparatus 1 at the time of the through-image acquisition on the basis of the detection result by the inclination detection unit 20, and thereby judges whether each of the inclinations in the roll direction and the yaw direction is less than a predetermined inclination (step S72). When judging that each of the inclinations in the roll direction and the yaw direction is not less than the predetermined inclination (step S72, NO), the main control unit 21 outputs an alert display which urges to modify the inclinations in the roll direction and the yaw direction (step S73), and proceeds to the processing in step S72.

When judging that each of the inclinations in the roll direction and the yaw direction is less than the predetermined inclination (step S72, YES), the main control unit 21 judges whether an imaging operation is input (step S74). When judging that no imaging operation is input (step S74, NO), the main control unit 21 proceeds to the processing in step S71. When judging that an imaging operation is input (step S74, YES), the main control unit detects, as subjects, the reinforcing bars that are shown in the through-image, and specifies a target reinforcing bar which is a reinforcing bar targeted for focusing among the detected main reinforcements 3 (step S75).

The main control unit 21 performs sequential shooting while driving the focus lens, and acquires multiple images for depth composite from the target reinforcing bar. To this end, the main control unit 21 first acquires an image for depth composition (step S76), and judges whether the depth composition is possible (step S77). When judging that the depth composition is not possible (step S77, NO), the main control unit 21 drives the focus lens, proceeds to the processing in step S76 and again acquires an image for depth composition (step S76), and judges whether the depth composition is possible (step S77).

For example, by repeating steps S76 to S78, the main control unit 21 acquires an image for depth composition while driving the focus lens by a preset length over the whole movable range of the focus lens. The main control unit 21 may be configured to recognize a subject distance of a specified target reinforcing bar, and acquire an image for depth composition while moving the focus lens over a predetermined range based on the subject distance.

When judging in step S77 that the depth composition is possible (step S77, YES), the main control unit 21 generates a depth composite image by performing the depth composition using multiple images for depth composition (step S79). Any method of depth composition may be used. For example, the main control unit 21 extracts an image of a region in which the focus is adjusted, that is, a focused region in each image for depth composition. The main control unit 21 generates a depth composite image having a greater depth of field by putting the images extracted from multiple depth composite image.

The main control unit 21 recognizes the pose of the housing of the imaging apparatus 1 at the time of the acquisition of the images for depth composition on the basis of the detection result by the inclination detection unit 20. Thus, the main control unit 21 detects the inclination of the housing of the imaging apparatus 1 in the pitch direction at the time of the acquisition of the images for depth composition (step S80). Further, the main control unit 21 acquires a subject distance and a figure distance in accordance with the state of the imaging lens 31 at the time of the acquisition of the images for depth composition (step S81).

The main control unit 21 generates a measurement image by correcting the depth composite image on the basis of the inclination in the pitch direction and subject distance (step S82). That is, the main control unit 21 corrects the distortion of the depth composite image attributed to the inclination in the pitch direction to generate a measurement image which is a corrected image of the focus image, and finishes the image acquiring processing. The main control unit 21 transitorily records information such as the images for depth composition, the depth composite image, the measurement image, the subject distance, and the figure distance in the memory of the main control unit 21.

FIG. 12 shows another example of the alteration prevention processing. Here, an example of the alteration prevention processing in the case where the depth composition is performed is described.

The main control unit 21 specifies, as a focus image, one or more of the images for depth composition acquired by the image acquiring processing (step S91).

The main control unit 21 calculates a hash value by inputting the images for depth composition and the measurement image to the hash function (step S92).

The main control unit 21 generates bar arrangement information by associating the focus image, the measurement image, the measurement result, the hash value, and the target information into a file form (step S93).

The main control unit 21 records the generated bar arrangement information in the recording medium M attached to the memory I/F 17 (step S94), and finishes the alteration prevention processing.

As described above, according to the configuration which corrects the depth composite image to generate the measurement image, the imaging apparatus 1 can acquire the measurement image which is focused on the whole target reinforcing bar. According to this configuration, it is possible to prevent an error from occurring in the measurement result due to defocus.

Although the depth composition in the embodiment described above is treated as the "correction" of the image, the imaging apparatus 1 may be configured to perform the depth composition for the purpose of normal photography instead of performing the depth composition for use in measurement. For example, the imaging apparatus 1 may be configured to treat, as the focus image 71, an image taken by performing the depth composition, that is, an image after the depth composition. That is, the imaging apparatus 1 may be configured to treat the depth composition as the above-mentioned general correction.

Although the main control unit 21 is configured to calculate a hash value by inputting multiple images for depth composition and the measurement image to the hash function in step S92, the main control unit 21 is not limited to this configuration. The main control unit 21 may be configured to calculate a hash value by inputting an image specified as a focus image from multiple images for depth composition and the measurement image to the hash function. The main control unit 21 may also be configured to calculate a hash value by inputting one of multiple images for depth composition to the hash function. The main control unit 21 may also be configured to calculate a hash value by inputting an image specified as a focus image from multiple images for depth composition to the hash function.

Although the imaging apparatus 1 is configured to comprise the display unit 16 in the embodiment described above, the imaging apparatus 1 is not limited to this configuration. The imaging apparatus 1 may be configured to output and display a screen, via the communication unit 18, to an external information processing terminal such as a tablet PC comprising a display unit. The imaging apparatus may also be configured to receive various operation signals via the communication unit 18.

For example, the imaging apparatus 1 may be configured as a lens type camera which does not have the display unit and to which through-images can be displayed and operations can be input by an external information processing terminal comprising a display unit.

Furthermore, the main control unit 21 does not comprise the reinforcing bar measurement unit 56, but the above-mentioned information processing terminal may be configured to store and hold the reinforcing bar measurement application corresponding to the reinforcing bar measurement unit 56 in the recording medium. In this case, the imaging apparatus 1 sends information such as the focus image, the subject distance, and the figure distance to the information processing terminal. The information processing terminal functions as an image processing apparatus which measures a reinforcing bar by performing the reinforcing bar measurement processing using the focus image, the subject distance, and the figure distance that have been received from the imaging apparatus 1.

Still further, the imaging apparatus 1 may be configured so that the main control unit 21 does not comprise the reinforcing bar measurement unit 56 but the server 5 stores and holds the reinforcing bar measurement application corresponding to the reinforcing bar measurement unit 56. In this case, the imaging apparatus 1 sends information such as the focus image, the subject distance, and the figure distance to the server 5. The server 5 functions as an image processing apparatus which measures a reinforcing bar by performing the reinforcing bar measurement processing using the focus image, the subject distance, and the figure distance that have been received from the imaging apparatus 1.

The above-mentioned reinforcing bar measurement application may be stored in the recording medium M. The imaging apparatus 1 may be configured to read and install the reinforcing bar measurement application from the recording medium M. The imaging apparatus 1 may also be configured to acquire and install the reinforcing bar measurement application from the server 5 via the communication unit 18. That is, the reinforcing bar measurement application may be stored in any recording medium.

As described above, various configurations of the imaging apparatus 1 such as the imaging unit, the display unit, and a reinforcing bar measurement processing may be obtained as a system by being discretely mounted on multiple devices that can communicate with one another. When the various configurations of the imaging apparatus 1 are discretely mounted on multiple devices in this way, the imaging apparatus can be simpler, smaller, and lighter. Thus, the imaging apparatus 1 having the imaging unit can be mounted on a pilotless plane such as a drone. As a result, it becomes easier to measure, for example, a reinforcing bar in a place which is difficult for a human being to check. This makes it possible to deal with disasters and accidents. Moreover, if the imaging apparatus having the imaging unit is mounted on a vehicle or a robot that can be remotely operated, it becomes easier to perform a measurement even when it is difficult to hold hands or measure with a slide caliper or a scale under human observation.

Furthermore, although the imaging apparatus 1 is configured to measure the dimensions of a target such as a reinforcing bar in the embodiment described above, the reinforcing bar is shown as a clear typical example of an important structure of a building, and the imaging apparatus 1 is also applicable to, for example, a window sash, a column, and a beam in addition to the "reinforcing bar". The imaging apparatus 1 is not limited to this configuration. The imaging apparatus 1 is an apparatus which associates and stores an actually taken image and the corrected image generated for the analysis of the taken image. For example, the imaging apparatus 1 may be used to record the image for specifying information and the actually taken image without being broken up. The imaging apparatus 1 may be used in a medical imaging apparatus, a semiconductor inspection apparatus, a microscopic imaging apparatus, a security camera, a drive recorder, or an imaging apparatus for an inspection apparatus of bills. Moreover, the apparatus may be an information processing apparatus which processes other information such as sound instead of the imaging apparatus. For example, the scope of the embodiment described above also includes an information processing apparatus which generates, from sound that has been collected, for example, corrected sound suited to dictation that has been subjected to noise reduction and a frequency conversion, obtains a hash value by inputting the original sound and the corrected sound to the hash function, and records these sounds in association with each other.

Although the imaging apparatus 1 is configured to comprise the lens 10 in the embodiment described above, the imaging apparatus 1 is not limited to this configuration. Instead of the lens 10, the imaging apparatus 1 may be configured to comprise a mount to which the lens 10 can be attached.

The functions described in the above embodiment are not exclusively configured by use of hardware, but can also be obtained by reading a program having each of the functions into a computer using software. Software or hardware may be suitably selected to configure each of the functions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
   a control unit including a central processing unit executing a program stored on a memory, comprising:
   an information acquiring unit which acquires image data of a target acquired by an imaging device, wherein the image data includes parallax information for reinforcing bars contained in an image of the target, and the information acquiring unit calculates distances to the reinforcing bars based on the parallax information;
   a measurement unit which acquires a measurement result by measuring diameters and an interval of the reinforcing bars based on the distances and figures of the reinforcing bars;
   an image correction unit which corrects the image data to generate measurement image data proportional to the image data to measure dimensions regarding the target; and
   a recording control unit which records the image data, the measurement result, and the measurement image data in association with each other in the memory.

2. The information processing apparatus according to claim 1, wherein the control unit further comprises an association data generating unit which generates association data to associate the image data with the measurement image data on the basis of the image data and the measurement image data.

3. The information processing apparatus according to claim 1, wherein the control unit further comprises an alteration prevention processing unit which generates alteration prevention data on the basis of both or each of the image data and the measurement image data.

4. The information processing apparatus according to claim 3,
   wherein the alteration prevention processing unit further associates the measurement result with the image data, the measurement image data, and the alteration prevention data.

5. The information processing apparatus according to claim 3, wherein the alteration prevention processing unit associates a hash value with the image data and the measurement image data as the alteration prevention data, the hash value being obtained by inputting both or each of the image data and the measurement image data to a preset hash function.

6. The information processing apparatus according to claim 2, wherein the recording control unit records the image data, the measurement image data, and the association data in one file.

7. The information processing apparatus according to claim 6, wherein the recording control unit records one of the image data and the measurement image data in the one file as main data, and records the other data in the one file as meta data.

8. The information processing apparatus according to claim 1, wherein
the imaging device comprises an imaging lens, and an image pickup device which acquires the image of the target formed by the imaging lens, and
the imaging device images the target and the information acquiring unit acquires the image data.

9. The information processing apparatus according to claim 1, wherein the measurement image data is an image which makes a keystone correction of the image data reinforcing bar.

10. The information processing apparatus according to claim 1, wherein the measurement image data is depth composite image data which is a composition of multiple images for depth composition that are acquired simultaneously with a change of a focus position.

11. A control method of an information processing apparatus comprising an information acquiring unit, an image correction unit, and a recording control unit, and a memory, the control method comprising:
acquiring image data by the information acquiring unit for a target that was imaged by an imaging device, wherein the image data includes parallax information for reinforcing bars contained in an image of the target;
calculating distances to the reinforcing bars based on the parallax information;
measuring diameters and an interval of reinforcing bars based on the distances and figures of the reinforcing bars to generate a measurement result;
correcting the image data to generate measurement image data proportional to the image data to measure dimensions regarding the target by the image correction unit; and
recording the image data, the measurement result, and the measurement image data in association with each other by the recording control unit in the memory.

12. A computer-readable non-transitory storage medium storing an information processing program which is executed by a computer, the information processing program comprising:
acquiring image data for a target that was imaged by an imaging device, wherein the image data includes parallax information for reinforcing bars contained in an image of the target;
calculating distances to the reinforcing bars based on the parallax information;
measuring diameters and an interval of reinforcing bars based on the distances and figures of the reinforcing bars to generate a measurement result;
correcting the image data to generate measurement image data proportional to the image data to measure dimensions regarding the target; and
recording the image data, the measurement result, and the measurement image data in association with each other in the storage medium.

13. An information processing apparatus comprising:
a control unit including a central processing unit executing a program stored on a memory, comprising:
an information acquiring unit which acquires image data of a target acquired by an imaging device, wherein the image data includes parallax information for reinforcing bars contained in an image of the target;
an image correction unit which corrects the image data to generate measurement image data proportional to the image data to measure dimensions regarding the target;
a measurement unit which acquires a measurement result by:
calculating, using the parallax information, distances to the reinforcing bars based on the measurement image data, and
determining diameters and an interval of the reinforcing bars based on the distances to the reinforcing bars; and
a recording control unit which records the image data, the measurement result, and the measurement image data in association with each other in the memory.

* * * * *